United States Patent [19]
Wakeman et al.

[11] 4,129,389
[45] Dec. 12, 1978

[54] AGITATOR CONSTRUCTION

[75] Inventors: Alden H. Wakeman, Lake Mills; Leonard R. Heiliger, Fort Atkinson, both of Wis.

[73] Assignee: Crepaco, Inc., Lake Mills, Wis.

[21] Appl. No.: 873,214

[22] Filed: Jan. 30, 1978

[51] Int. Cl.² .............................................. B01F 7/12
[52] U.S. Cl. ..................................... 366/144; 62/343; 366/280; 366/292; 366/312
[58] Field of Search ............... 366/144, 280, 292, 312, 366/145, 147; 62/343, 69, 68

[56] References Cited

U.S. PATENT DOCUMENTS

| | | | |
|---|---|---|---|
| 824,075 | 6/1906 | Gerner | 62/343 |
| 2,210,366 | 8/1940 | Godfrey | 62/69 |
| 2,309,424 | 1/1943 | Weinreich | 366/246 |
| 3,037,748 | 6/1962 | Wakeman | 366/288 |
| 3,214,147 | 10/1965 | Wakeman | 366/294 |
| 3,641,783 | 2/1972 | Werner | 62/343 |

Primary Examiner—Robert W. Jenkins
Attorney, Agent, or Firm—Neuman, Williams, Anderson & Olson

[57] ABSTRACT

An agitator construction is provided for use with a dasher assembly rotatably mounted within an elongated cylindrical chamber through which a viscous product is caused to flow. The dasher assembly includes an elongated skeletal section having the periphery thereof in scraping engagement with the chamber interior surface. The agitator construction includes an elongated imperforate cylindrical support unit fixedly mounted within the skeletal section and having the central longitudinal axis of the unit offset with respect to the rotary axis of the dasher assembly. An elongated cagelike member is mounted in encompassing relation on the exterior of the support unit for rotation independently thereof about the central axis of the support unit in response to the rotation of the dasher assembly and the product flowing through the chamber.

9 Claims, 9 Drawing Figures

AGITATOR CONSTRUCTION

BACKGROUND OF THE INVENTION

In the commercial production of ice cream, margarine and other similar viscous products it is important from a marketing standpoint and customer acceptance that the resultant product have a uniform texture, palatable character and controlled overrun. Various equipment, such as agitators, reaction beaters and the like, have heretofore been utilized in an effort to achieve the aforenoted results; however, due to various structural design characteristics such equipment has been beset with one or more of the following shortcomings: (a) the viscous product as it flows through the chamber tends to rotate as a mass with the result that there is minimal relative movement within the mass itself and uneven distribution of air or other fluid within the product; (b) excessive amount of whipping of the flowing product occurs resulting in some instances (e.g., ice cream mix) in protein distabilization; (c) the equipment is of complex, costly construction and requires an inordinate amount of service and maintenance; (d) the equipment is not capable of being readily disassembled for cleaning or is not readily capable of being cleaned in place; (e) in instances where the dasher assembly and agitator are disposed within a refrigerated chamber, the dasher assembly and agitator do not effectively prevent buildup of frozen product on the interior surface of the chamber or on the various components of the assembly and agitator and, thus, uniform consistency and temperature throughout the product cannot be achieved; and (f) the equipment lacks the strength to withstand high torque forces caused when the viscosity of the flowing product exceeds a certain amount.

SUMMARY OF THE INVENTION

Thus, it is an object of the invention to provide an agitator and dasher assembly which readily avoid the aforenoted shortcomings associated with prior equipment of this general type.

It is a further object of the invention to provide an agitator and dasher assembly which are capable of being used with a wide variety of viscous products.

It is a still further object of the invention to provide an agitator which is of simple design and consists of a minimal number of components.

Further and additional objects will appear from the description, accompanying drawings and appended claims.

In accordance with one embodiment of the invention an elongated agitator is provided which is adapted to be disposed within an elongated skeletal section of a dasher assembly. The dasher assembly is rotatably mounted within a cylindrical chamber through which a viscous product is caused to flow. The rotary axis of the dasher assembly is coaxial with the central longitudinal axis of the chamber. The agitator includes an elongated imperforate cylindrical support unit which is fixedly mounted within the skeletal section of the dasher assembly. The central longitudinal axis of the support unit is offset with respect to the rotary axis of the dasher assembly. Mounted in encompassing relation on the exterior of the support unit is an elongated cagelike member. The cagelike member is adapted to rotate independently of the support unit about the central axis of the latter in response to the rotation of the dasher assembly and the flow of the product through the chamber.

For a more complete understanding of the invention reference should be made to the drawings wherein:

FIG. 4 is a perspective view of one form of the improved agitator shown in FIG. 2.

FIG. 8 is a right end elevational view of the dasher assembly shown in FIG. 2.

Figure 1:
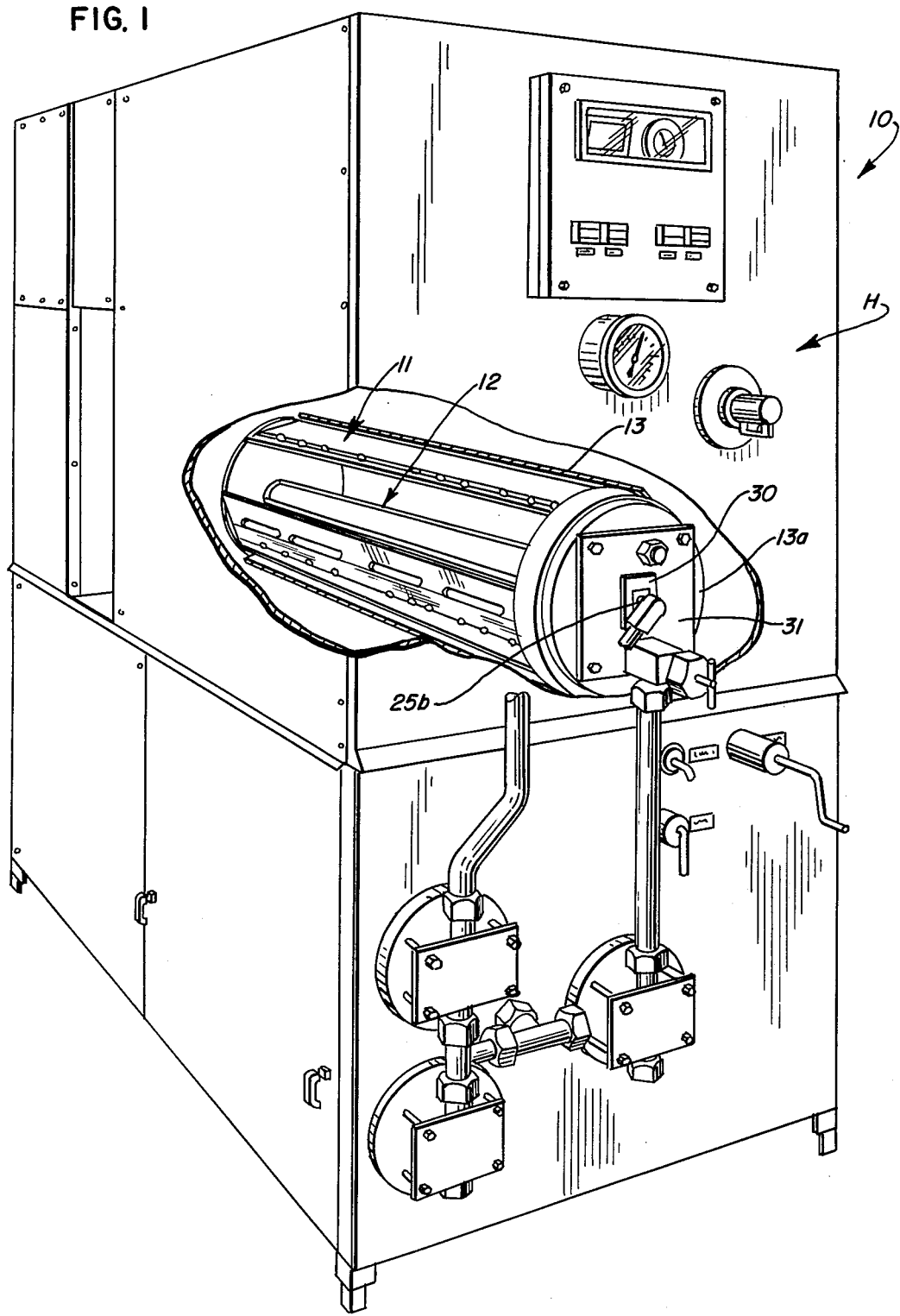
FIG. 1 is a fragmentary perspective view of a continuous ice cream freezer in which one form of the improved agitator and a compatible dasher assembly are embodied therein; portions of the freezer housing and freezer chamber have been removed so as to expose the agitator and dasher assembly.

Referring now to the drawings and more particularly to FIG. 1, one form of a continuous ice cream freezer 10 is shown which is adapted for use in the commercial production of ice cream or the like. The invention to be hereinafter described is not intended to be limited to an ice cream freezer but may be readily utilized in equipment used in the production of margarine and the like. Except for the structure of the dasher assembly 11 and the agitator 12, the basic components of the freezer are substantially the same as those described in applicants' application for United States letters patent, Ser. No. 864,631 filed on Dec. 17, 1977 and entitled "Dasher Assembly".

For purposes of understanding the invention in question, it should be noted that the dasher assembly 11 and agitator 12 are both disposed within an elongated cylindrical chamber 13 through which a viscous product (e.g., a mixture of ice cream and air) is caused to travel. The uniform dispersion of the air throughout the frozen mix will result in an ice cream product having a controlled overrun.

Figure 2:
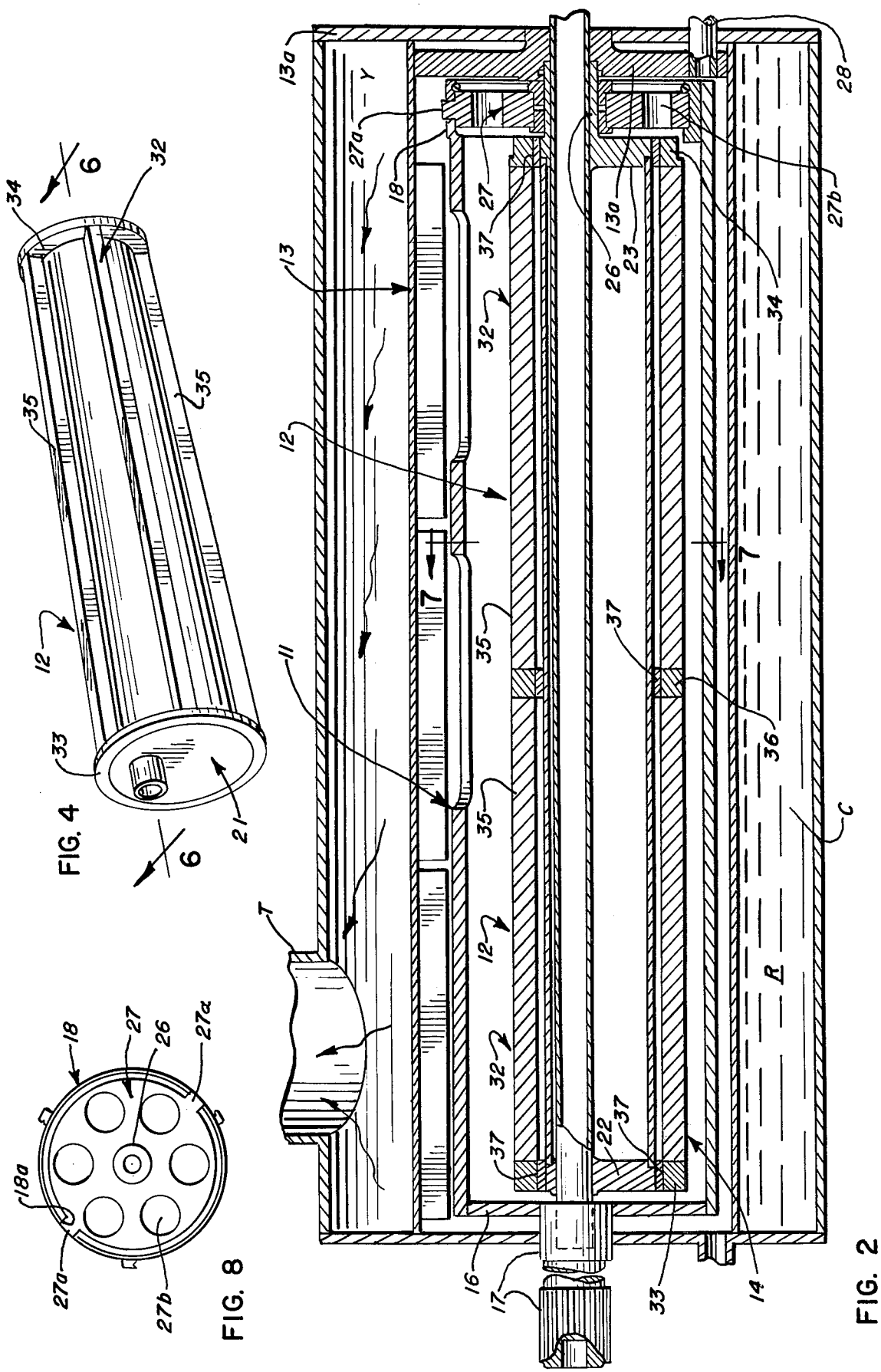
FIG. 2 is an enlarged fragmentary vertical sectional view of one form of the improved agitator and associated dasher assembly.

In the illustrated embodiment, the chamber 13 is refrigerated and is disposed within a large cavity C containing liquid refrigerant R, see FIG. 2. As the refrigerant evaporates the resulting gas passes through an upwardly extending tank T which is concealed within the housing H of the freezer 10.

Figure 3:
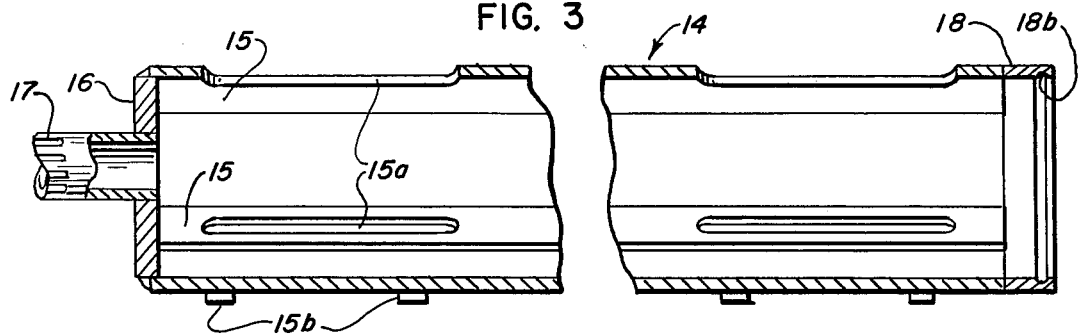
FIG. 3 is an enlarged fragmentary vertical sectional view of the dasher assembly per se shown in FIG. 1.

The dasher assembly 11, as seen more clearly in FIG. 3, includes an elongated skeletal section 14 having a plurality of symmetrically arranged elongated ribs 15 which are interconnected at one end by a disc-shaped end plate 16 from which axially protrudes a splined shaft 17. The opposite ends of the ribs 15 are interconnected by a ring 18. The ring 18 is provided with a plurality of symmetrically arranged open-ended slots 18a, the function of which will be described more fully hereinafter. The dasher assembly 11 is power driven by conventional means through shaft 17 so as to rotate in one direction within the chamber 13.

Each rib 15 is provided with one, or more, elongated openings 15a. In addition, the exterior of each rib is provided with a plurality of longitudinally spaced outwardly projecting posts 15b which are engaged by and support a scraper blade 20. The blades project angularly outwardly from the ribs and the outer edge of the blade is in scraping engagement with the interior surface of chamber 13 and removes the freezing product from the chamber wall surface. Besides preventing the buildup of frozen product on the chamber surface, the blades direct the product inwardly towards the rotary axis of the dasher assembly and, thus, cause constant moving or kneading of the product. Movement of the product past or through the ribs is facilitated by the elongated openings 15a formed in the ribs 15.

Disposed within the skeletal section 14 of the dasher assembly is the agitator 12, seen more clearly in FIG. 4. The agitator includes an elongated, imperforate cylindrical support unit 21 which is fixedly mounted within the skeletal section. The central longitudinal axis of the support unit 21 is laterally offset with respect to the rotary axis of the dasher assembly.

Figure 6:
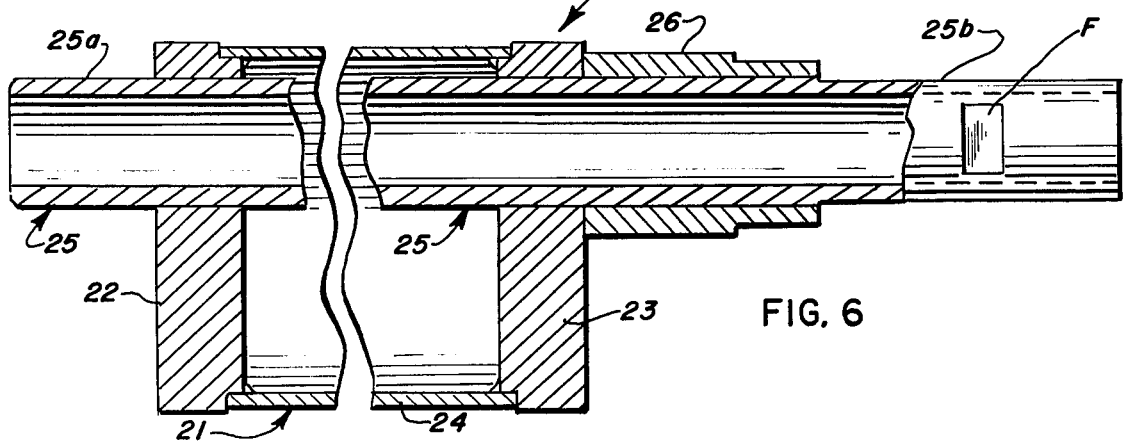
FIG. 6 is an enlarged fragmentary sectional view taken along line 6—6 of FIG. 5.

As seen more clearly in FIG. 6, support unit 21 includes a pair of coaxially aligned, longitudinally spaced disc-shaped end plates 22, 23 which are interconnected to one another by an imperforate cylindrical sleeve 24. The circumferential configuration of the plates and sleeve are substantially the same. Extending longitudinally through the plates and sleeve is a shaft 25 having the ends 25a, 25b extending beyond the plates 22, 23. In the illustrated embodiment shaft 25 is of tubular construction and, thus, may function as a duct for pressurized sanitary air which is introduced into the chamber interior for mixing with ice cream mix or the like as will be described more fully hereinafter.

As will be noted in FIG. 6, a collar bearing 26 is affixed to the outer face of plate 23. The bearing 26 is engaged by an apertured annular end plate 27, which interfits within the ring 18 disposed at one end of the skeletal section 14. As seen more clearly in FIG. 8, plate 27 is provided with a plurality of radially extending lugs 27a which are adapted to fit within the corresponding open-ended slots 18a formed in ring 18 thereby causing the plate 27 and ring 18 to rotate as a unit. The apertures 27b formed in plate 27 permit the product to pass therethrough and out through a discharge port 28 formed at the front end 13a of the chamber 13, see FIG. 2.

As seen in FIG. 3, the interior surface of ring 18 is provided with an annular groove 18b which is adapted to accommodate a snap ring Y, the latter retaining the end plate 27 in assembled relation with the ring 18.

Figure 7:
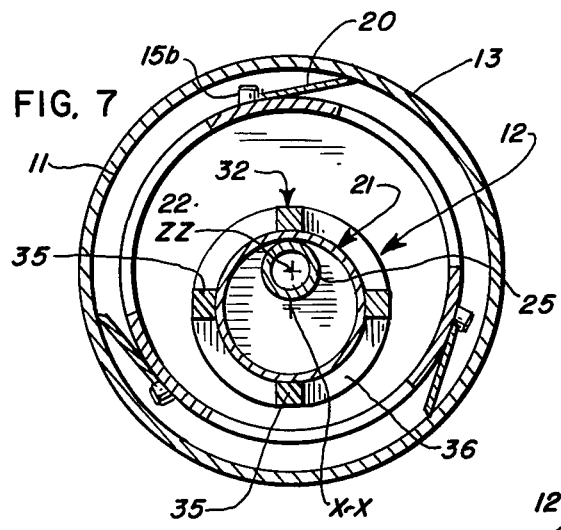
FIG. 7 is an enlarged fragmentary sectional view taken along line 7—7 of FIG. 2.
Figure 5:
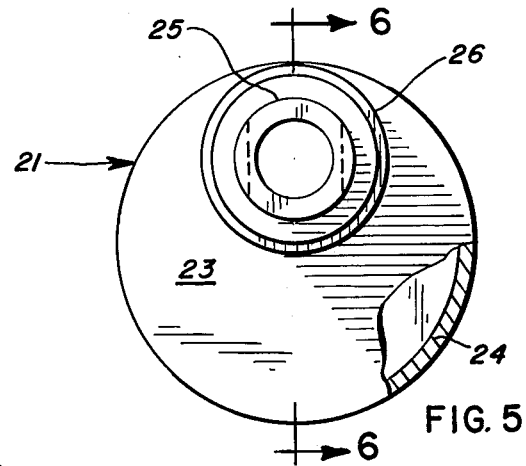
FIG. 5 is an end elevational view of the agitator of FIG. 4.

The central longitudinal axis X—X of the support unit 21 is laterally offset from the axis of rotation Z—Z of the dasher assembly 11 which, in turn, is also the central longitudinal axis of shaft 25, see FIG. 7. As aforementioned, the support unit 21 remains in a fixed non-rotating position within the skeletal section 14. One way of retaining shaft 25 in a non-rotating position is to utilize a fork 30 the prongs of which straddle the end 25b of the shaft 25 which protrudes beyond the chamber front end 13a and an access plate 31 secured thereto. A pair of diametrically opposed facets F are formed on the exterior of the shaft end which are snugly engaged by the fork prongs. Rotation of the fork 30 is prevented by a suitable stop, not shown, provided on the exterior of the access plate 31.

Mounted in encompassing relation on the exterior of support unit 21 for independent rotation with respect thereto is an elongated cagelike member 32. Rotational movement of the member is effected by the flowing product and the rotation of the dasher assembly. The cagelike member 32 includes a pair of axially aligned, longitudinally spaced ring pieces 33, 34 which, in turn, are interconnected to one another by a plurality of symmetrically arranged rodlike elements 35, see FIGS. 2 and 7. Where the axial dimension of the agitator 12 is substantial (e.g., 3-4 feet) an additional ring piece 36 may be utilized which is disposed at substantially mid-length of the elements 35. Ring pieces 33, 34 are disposed in concentric relation with the respective end plates 22, 23 of the support unit 21. An annular bearing piece 37 may be disposed between the periphery of the end plate and the ring piece. A similar bearing 37 may be interposed the ring piece 36 and the periphery of the sleeve 24 aligned therewith. Because of the close proximity of the cagelike member 32 to the exterior of the support unit 21, the member 32 as it rotates about unit 21 prevents buildup of the product or ice on the support unit.

The imperforate character of the support unit 21 effects a displacement of approximately 33% of the space delimited by the skeletal section 14 of the dasher assembly 11. Thus, as the product flows through the chamber 13 it is forced to move around the support unit 21 rather than through it and thereby is effectively squeezed and kneaded between the skeletal section 14 and the supporting unit 21 and by the revolving rodlike elements 35. Furthermore, as the dasher assembly rotates, the blades 20 carried on the ribs 15 cause the product disposed adjacent the surface of the chamber 13 to move therefrom towards the rotary axis of the dasher assembly. The combined effect of the scrapper blades 20 and the rodlike elements 35 result in a thorough and uniform dispersion of air throughout the flowing product, be it ice cream mix, margarine, butter or a similar viscous product.

Figure 3A:
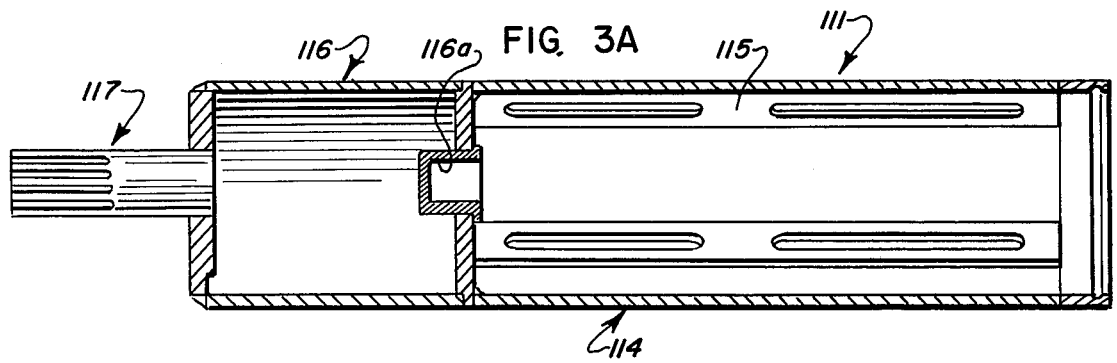
FIG. 3A is similar to FIG. 3 but showing a modified form of dasher assembly which may be used in combination with the improved agitator.

FIG. 3A shows a modified form of a dasher assembly 111 which is of a type disclosed in the aforenoted pending application. Where appropriate the components of assembly 111 which correspond to the components of assembly 11 will be identified by the same numeral but in a 100 series. The principal difference between assemblies 11 and 111 is that in assembly 111, the rear ends of the ribs 115 are affixed to a drumlike displacement section 116 rather than the disc-shaped plate 16. The rear end of section 116 has protruding axially therefrom a splined shaft 117. The forward facing end of the displacement section 116 is provided with an axially aligned pocket 116a in which the shaft end 25a of the support unit is journaled. The exterior of displacement section 116 is disposed in proximity to the interior surface of the chamber thereby forming a narrow annular passage through which the product is caused to flow before reaching the skeletal section 114. The exterior of section 116 is provided with a plurality of symmetrically arranged lands or flats, not shown, from which scraper blades project. The latter blades extend into the narrow annular passage and slidably engage the chamber surface and prevent buildup of the product on the chamber surface which would otherwise close off the narrow annular passage.

The length and size of the chamber, dasher assembly, and agitator may vary from that shown and will depend upon the product being processed. Furthermore, the number of ribs comprising the skeletal section of the dasher assembly or the number of rodlike elements comprising the cagelike member may also be varied from that shown without departing from the scope of the invention. In any case, it is desirable that the agitator and the skeletal section be substantially coextensive.

Thus, an agitator and complemental dasher assembly have been provided which are of simple compact construction, result in uniform dispersion of air within the product without causing protein distabilization, and are capable of handling a wide variety of viscous products.

We claim:

1. An agitator construction for use within an elongated skeletal dasher assembly rotatable about its longitudinal axis, the dasher assembly being disposed within an elongated cylindrical chamber through which a viscous product is caused to flow; said agitator construction comprising an elongated imperforate cylindrical support unit fixedly mountable within the dasher assembly, the central longitudinal axis of the support unit being offset with respect to the rotary axis of the dasher assembly; and an elongated cagelike member mounted on and in close encompassing relation substantially throughout said support unit for independent rotation about the central longitudinal axis of said support unit in response to the rotation of the dasher assembly and the product flow through the chamber.

2. The agitator construction of claim 1 wherein the portion of said support unit encompassed by said cagelike member has a substantially uniform cylindrical exterior configuration.

3. The agitator construction of claim 2 wherein said cagelike member includes a pair of ringlike end sections and a plurality of symmetrically arranged rodlike pieces affixed to and interconnecting said end sections.

4. The agitator construction of claim 3 wherein said cagelike member and the portion of said support unit encompassed thereby are substantially coextensive with one another.

5. The agitator construction of claim 2 wherein the support unit includes a pair of aligned longitudinally extending bearing elements, said elements being adapted to be supported by said dasher assembly and coaxial with the axis of rotation of the dasher assembly.

6. The combination of a cylindrical chamber through which a viscous product is caused to flow; an elongated dasher assembly power driven for rotation about the central axis of said chamber, said assembly being provided with an elongated skeletal section the outer periphery of which is in substantial scraping engagement with the chamber interior surface; and an elongated agitator mounted within said skeletal section, said agitator including an elongated fixedly mounted imperforate cylindrical support unit having the central axis thereof offset with respect to the rotary axis of said dasher assembly, and an elongated cagelike member mounted on and in close encompassing relation substantially throughout said support unit for independent rotation about the central axis of said support unit in response to the rotation of said dasher assembly and the product flow through the chamber.

7. The combination of claim 6 wherein the wall surface of the chamber is refrigerated.

8. The combination of claim 7 wherein the support unit includes a pair of annular end plates disposed in axially aligned relation, and an imperforate sleeve member affixed to and interconnecting said end plates, said end plates and sleeve member having substantially the same circumferential dimensions.

9. The combination of claim 6 wherein the agitator displaces substantially 33% of the space delimited by the skeletal section of said dasher assembly.

* * * * *